US011364830B2

(12) United States Patent
Won et al.

(10) Patent No.: US 11,364,830 B2
(45) Date of Patent: Jun. 21, 2022

(54) APPARATUS FOR ADJUSTING HEIGHT OF HEADREST FOR MOTOR VEHICLE

(71) Applicants: Hyundai Motor Company, Seoul (KR); Kia Motors Corporation, Seoul (KR); WOOBO TECH CO., LTD., Pyeongtaek-si (KR)

(72) Inventors: Tae Hee Won, Hwaseong-si (KR); Sang Ho Kim, Incheon (KR); Byeong Kwang Kim, Gumi-si (KR); Seok Hwan Kim, Suwon-si (KR); Hae Il Jeong, Incheon (KR)

(73) Assignees: Hyundai Motor Company, Seoul (KR); Kia Motors Corporation, Seoul (KR); Woobo Tech Co., Ltd., Pyeongtaek-si (KR)

( * ) Notice: Subject to any disclaimer, the term of this patent is extended or adjusted under 35 U.S.C. 154(b) by 0 days.

(21) Appl. No.: 17/142,126

(22) Filed: Jan. 5, 2021

(65) Prior Publication Data
US 2022/0048420 A1    Feb. 17, 2022

(30) Foreign Application Priority Data
Aug. 11, 2020    (KR) .......................... 10-2020-0100249

(51) Int. Cl.
*B60N 2/815*    (2018.01)
*B60N 2/818*    (2018.01)

(52) U.S. Cl.
CPC ............. *B60N 2/815* (2018.02); *B60N 2/818* (2018.02)

(58) Field of Classification Search
CPC ................................ B60N 2/815; B60N 2/818
See application file for complete search history.

(56) References Cited

U.S. PATENT DOCUMENTS

| 4,256,341 | A * | 3/1981 | Goldner | B60N 2/818 |
| | | | | 297/410 |
| 6,464,294 | B1 * | 10/2002 | Kain | B60N 2/2872 |
| | | | | 297/410 |
| 7,887,135 | B2 * | 2/2011 | Oda | A47C 1/036 |
| | | | | 297/410 |
| 9,085,253 | B2 * | 7/2015 | Delling | B60N 2/891 |
| 10,238,215 | B2 * | 3/2019 | Peterson | A47C 1/03255 |
| 10,829,019 | B2 * | 11/2020 | Dexter | B60N 2/643 |

FOREIGN PATENT DOCUMENTS

| KR | 20060103302 A * | 9/2006 | ............. B60N 2/809 |
| KR | 101103560 B1 * | 1/2012 | ............. B60N 2/809 |

* cited by examiner

*Primary Examiner* — David R Dunn
*Assistant Examiner* — Tania Abraham
(74) *Attorney, Agent, or Firm* — Morgan, Lewis & Bockius LLP

(57) ABSTRACT

An apparatus of adjusting height of a headrest for a motor vehicle is provided. By forming the headrest with two divided parts, a rear portion fastened to a seatback by a stay and a front portion assembled to the rear portion movably in an up and down direction, the apparatus allows an occupant to adjust the height of the front portion according to his or her body size or preference, and thus is configured for comfortably supporting the head or neck portion of the occupant with the front portion regardless of the body size of the occupant.

17 Claims, 9 Drawing Sheets

(Related Art)

APPARATUS FOR ADJUSTING HEIGHT OF HEADREST FOR MOTOR VEHICLE

CROSS REFERENCE TO RELATED APPLICATION

The present application claims priority to Korean Patent Application No. 10-2020-0100249, filed on Aug. 11, 2020, the entire contents of which is incorporated herein for all purposes by this reference.

BACKGROUND OF THE INVENTION

Field of the Invention

The present invention relates to generally to an apparatus for adjusting height of a headrest for a motor vehicle, and more particularly, to an apparatus for adjusting height of a headrest for a motor vehicle which, by forming the headrest with a rear portion fastened to a seatback and a front portion mounted to the rear portion movably in an up and down direction, allows a passenger or a driver (hereinafter, referred to as "occupant") to adjust height of the front portion according to his or her body size (or shape) or preference.

Description of Related Art

As is well known, a seat for a motor vehicle is configured to include a seat cushion on which an occupant can place his or her lower body portion, a seatback against which the occupant can lean his or her back, and a headrest for supporting the neck and head of the occupant.

The headrest is provided with a stay protruding from a lower portion thereof and fastened to the interior of the seatback movably in the up and down direction thereof.

Thus, by raising or lowering the stay to a desired position, the height of the headrest may be adjusted.

However, the conventional headrest has drawbacks as described below.

First, the conventional headrest cannot properly support head and neck portions of an occupant having a small body size.

Referring to FIG. 1, even when a stay 20 is inserted into a seatback 30 up to its shortest position, so that the headrest 10 is adjusted to its lowest position, the head portion of the occupant having a small body size or short stature is supported by a lower portion of the headrest 10, and thus the neck of the occupant may be bent forward thereof.

Second, the conventional headrest cannot properly support the neck portion of an occupant.

Referring to FIG. 2, even though the head of the occupant is leaned against the headrest 10, the neck portion is not supported by the headrest 10, and the occupant may feel uncomfortable.

Third, since the neck portion is not properly supported by the headrest even though the head is supported by the headrest, the occupant needs to buy and mount a separate neck supporting cushion 40 to the headrest 10 as shown in FIG. 3, causing additional expenditure of time and money.

Accordingly, there is a demand for a headrest configured for comfortably supporting head and neck portions of an occupant by adjusting height thereof according to his or her body size.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus of adjusting height of a headrest for a motor vehicle, which, by forming the headrest with a rear portion fastened to a seatback by a stay and a front portion mounted to the rear portion movably in an up and down direction, allows an occupant to adjust height of the front portion according to his or her body size or preference.

In various aspects of the present invention, there is provided an apparatus of adjusting height of a headrest for a motor vehicle, the apparatus including: a rear cover having a stay mounted thereto, the stay being inserted and fastened to a seatback; a rear plate which is provided with a series of locking grooves formed on a front surface portion of the rear plate in an up and down direction, and is mounted to a front surface portion of the rear cover; a front plate provided with an in and out hole penetratingly formed in the front plate, and fastened to the rear plate movably in the up and down direction thereof; a front cover fastened to a front surface portion of the front plate to serve as a frame for a front pad; an insert plate which is provided with two or more guide pins protruding therefrom, and is mounted to a rear surface portion of the front cover; a lock plate which forms a laminated structure together with the insert plate, and is provided with two or more guide holes formed in the center portion thereof in an oblique manner with respect to a front and rear direction thereof and into which the guide pins are inserted, a locking end portion formed in a rear portion of the lock plate which passes through the in and out hole of the front plate and is lockably inserted into one of the series of locking grooves of the rear plate, and a spring formed in the front portion thereof which is elastically supported on the rear surface portion of the front cover; the front pad mounted to the front surface portion of the front cover; and a button which is pressably mounted on the front pad, and in a penetrating hole formed in a side surface of the front cover to be connected to the lock plate.

Blocking protrusions may be formed at upper and lower positions on the front surface portion of the rear plate, and limit vertical movement of the lock plate by blocking the locking end of the lock plate.

Slide protrusions may be formed at opposite side positions on the front surface portion of the rear plate, and slide grooves may be formed at opposite side positions on the rear surface portion of the front plate, wherein the slide protrusions may be fastened to the slide grooves slidably in the up and down direction thereof.

A first mounting hole may be formed in a peripheral portion of the rear plate, and a first mounting groove may be formed in the rear cover, wherein a screw may be inserted through the first mounting hole and fastened to the first mounting groove.

A second mounting hole may be formed in a peripheral portion of the front cover, and a second mounting groove may be formed in a front surface portion of the front plate, wherein a screw is inserted through the second mounting hole and fastened to the second mounting groove.

The guide pins may be formed on a lower surface of a center portion of the insert plate to protrude downward therefrom and be slidably inserted into the guide holes of the lock plate.

Elastic locking legs may be formed at opposite side portions of the insert plate, and locking holes for being fastened with the elastic locking legs may be formed at opposite side portions on the rear surface of the front cover.

A guide projection may be formed on an upper surface of the insert plate, and a guide groove to which the guide projection is inserted may be formed on the rear surface portion of the front cover.

A button connection plate in a form of a flat plate may be integrally formed at a side portion of the lock plate, and may be connected to the button via a connection shaft.

The spring may be configured for a coil portion integrally formed with the lock plate, and a supporting leg which extends from the coil portion in a form of a free end and is elastically supported by the rear surface portion of the front cover.

The present invention may achieve advantageous effects as described below by providing above-mentioned embodiments for eliminating drawbacks.

First, by forming the headrest with two divided parts, for example, a rear portion fastened to a seatback and a front portion mounted to the rear portion movably in an up and down direction, height of the front portion may be adjusted according to a body size or preference of an occupant, and thus the head or neck portion of the occupant may be comfortably supported by the front portion regardless of the body size of the occupant.

Second, by applying to a relaxation seat or the like the apparatus of adjusting height of a headrest according to various exemplary embodiments of the present invention, the head and up to the neck portion of an occupant may be comfortably supported when the occupant selects a relaxation posture, thus improving a commercial value of the seat.

Third, since the neck portion of an occupant may be supported without mounting a separate neck supporting cushion to the headrest, it is possible to reduce costs by eliminating the demand for a user to purchase a separate neck supporting cushion.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
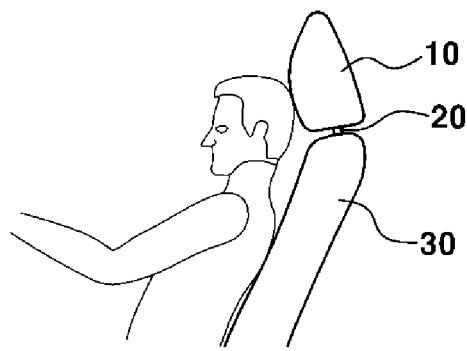
FIG. 1 and FIG. 2 schematically represent an example where the head of an occupant is supported by the conventional headrest.
Figure 2:
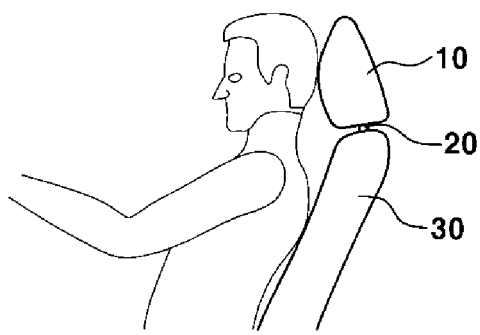
Figure 3:
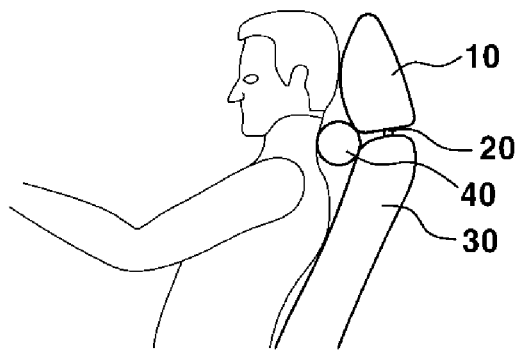
FIG. 3 schematically represents a state where a separate neck supporting cushion is mounted to the conventional headrest.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, exemplary embodiments of the present invention will be described in detail with reference to the appended drawings. Following embodiments are provided just as examples to sufficiently convey the conceptual idea of the present invention to those skilled in the art. Therefore, the present invention is not limited to the exemplary embodiments described below, but may be embodied in other forms. Furthermore, length, thickness or the like of a layer and a region may be represented in an exaggerated manner in the drawings for the sake of convenience. Reference now may be made to the drawings, in which the same reference numerals are used throughout the different drawings to designate the same or similar components.

Figure 4:
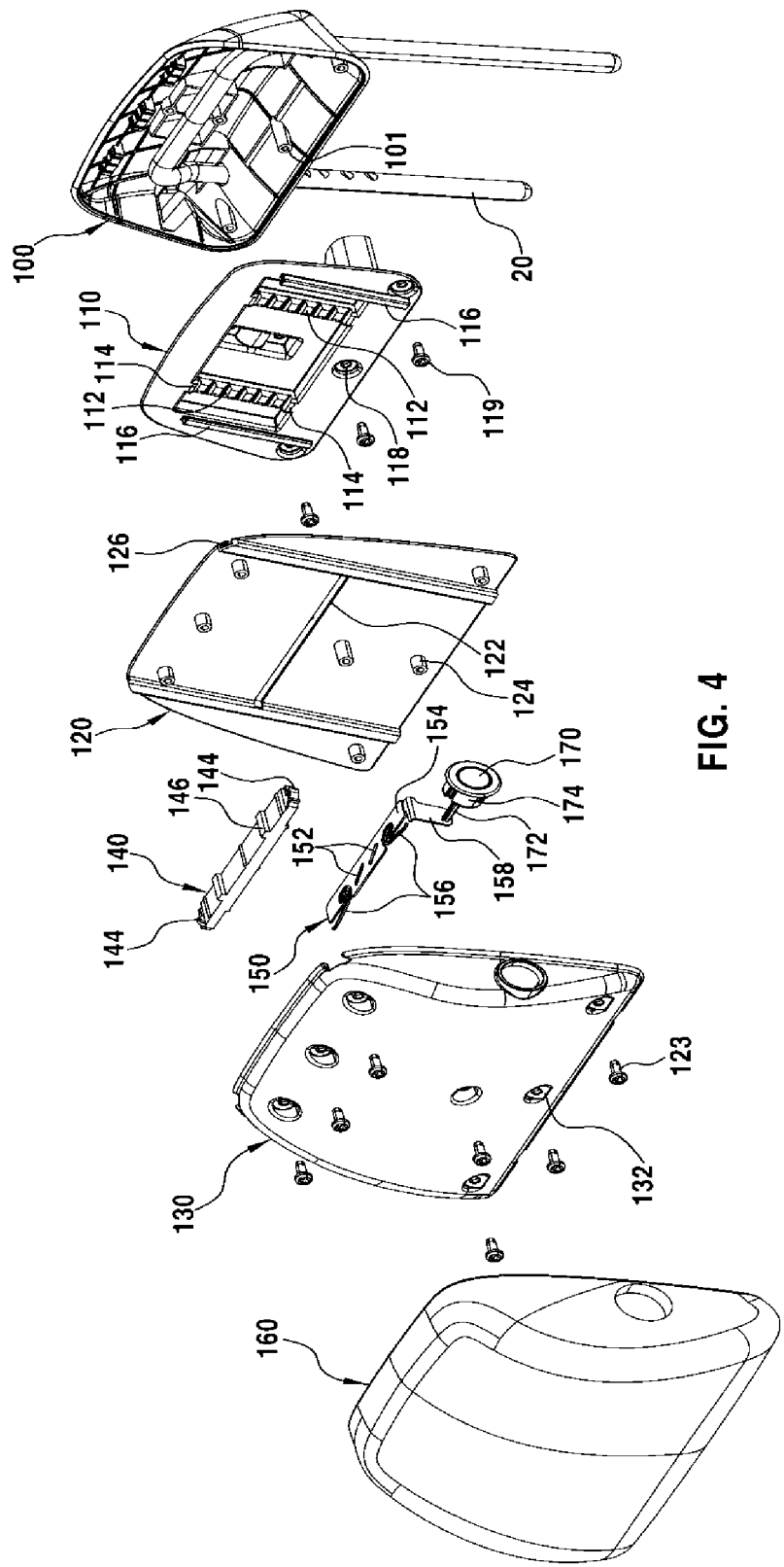
FIG. 4 represents an exploded perspective view of an apparatus of adjusting height of a headrest for a motor vehicle according to various exemplary embodiments of the present invention.
Figure 5:
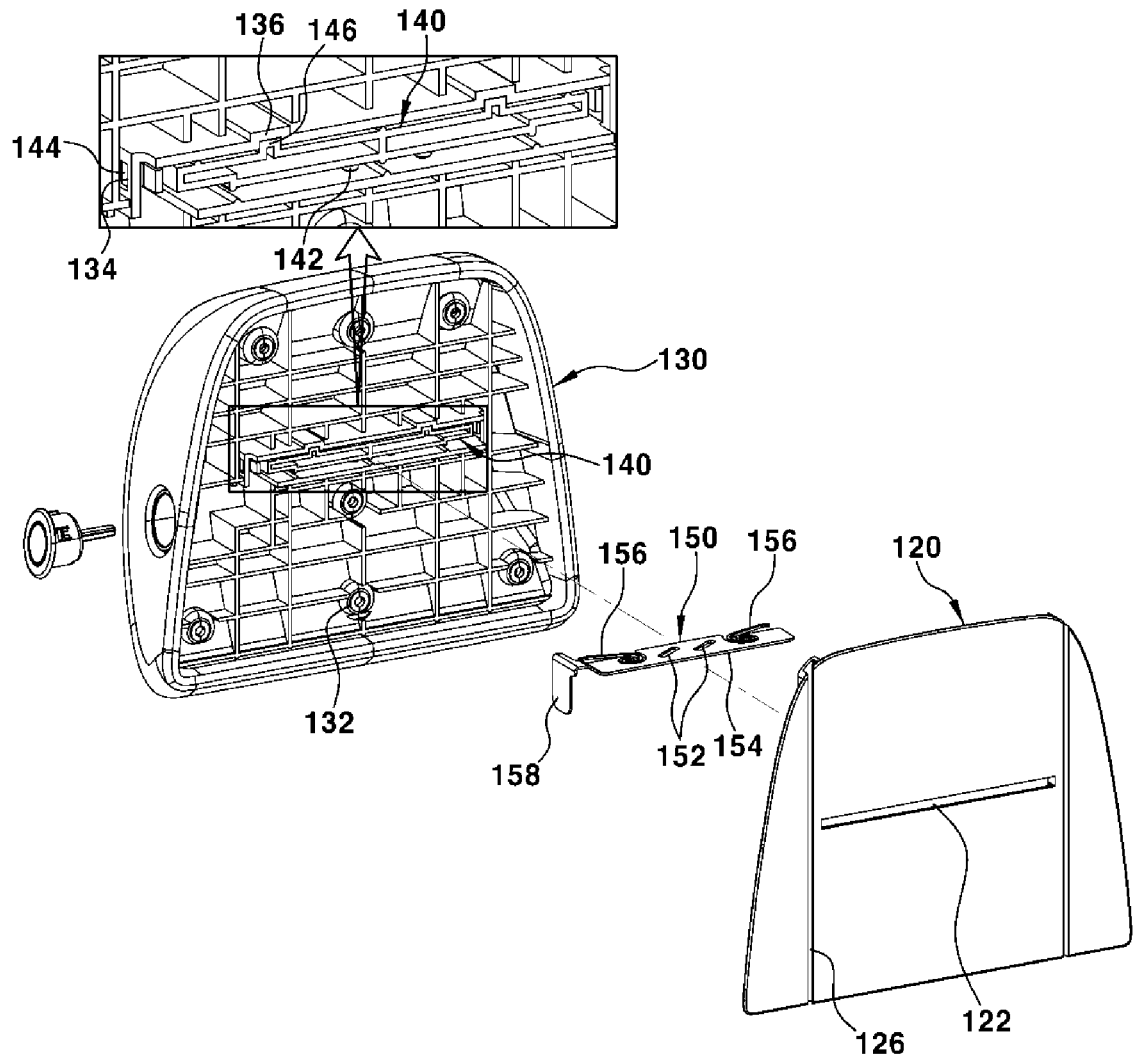
FIG. 5 represents an exploded perspective view of a front cover of an apparatus of adjusting height of a headrest for a motor vehicle, to which an insert plate is mounted, according to various exemplary embodiments of the present invention.
Figure 6:
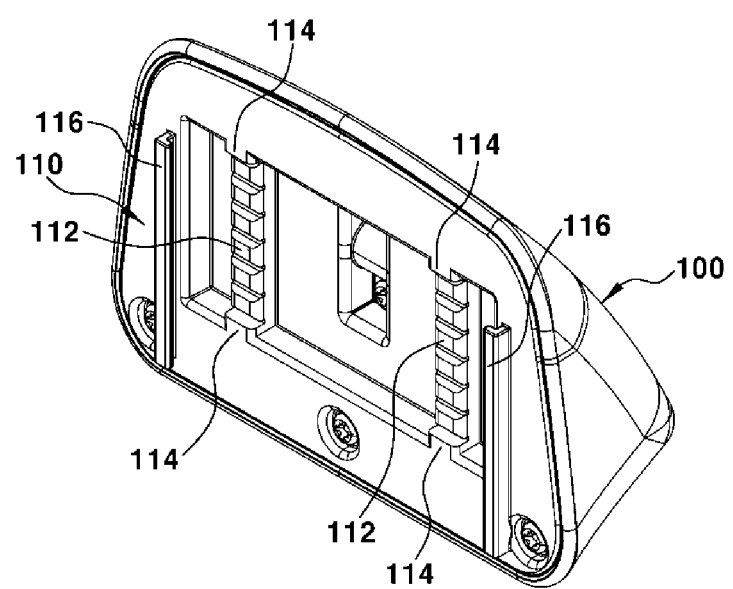
FIG. 6 represents a perspective view of a rear cover of an apparatus of adjusting height of a headrest for a motor vehicle, to which a rear plate is mounted, according to various exemplary embodiments of the present invention.

Accompanying FIG. 4, FIG. 5 and FIG. 6 are perspective views illustrating an apparatus of adjusting height of a headrest for a motor vehicle according to various exemplary embodiments of the present invention, and in each drawing, reference number 100 denotes a rear cover.

An upper end portion of a stay 20 may be coupled to the interior of the rear cover 100, and lower portions of the stay 20 may be in the shape of a pair of bars and inserted into and fastened to a seatback.

Accordingly, the rear cover 100 is fixed to the seatback 30 by the stay 20.

In this regard, a first mounting groove 101 used to assemble a rear plate 110 to the rear cover 100 may be formed at a desired position on a peripheral portion of the front surface of the rear cover 100.

The rear plate 110 may be a plate body structure mounted to close a front opening of the rear cover 100, and be provided with a series of locking grooves 112 formed on the front surface portion thereof along the vertical direction thereof.

Preferably, two series of locking grooves 112 may be disposed in two columns along the vertical direction on the front surface portion of the rear plate 110, and the locking grooves 112 may be formed at an equal interval along the vertical direction thereof.

Furthermore, to limit the vertical movement of a lock plate 150, at upper and lower positions on the front surface portion of the rear plate 110, blocking protrusions 114 by which a locking end portion 154 of the lock plate 150 is caught may be formed.

Furthermore, slide protrusions 116 may be formed at opposite side positions of the front surface portion of the rear plate 110, so that a front plate 120 may be fastened to the rear plate 110 movably in an up and down direction thereof.

Furthermore, a first mounting hole 118 may be formed at a desired position on a peripheral portion of the front surface of the rear plate 110 such that the first mounting hole is aligned with the first mounting groove 101 of the rear cover 100.

Thus, by inserting a screw 119 through the first mounting hole 118 of the rear plate 110 and tightening the screw 119 to the first mounting groove 101 of the rear cover 100, the rear plate 110 may be mounted to the rear cover 100.

The front plate 120 may be fastened to the front surface portion of the rear plate 110 movably in the up and down direction thereof.

Figure 9:
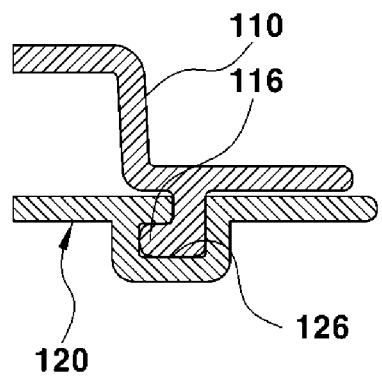
FIG. 9 is an enlarged sectional view of a portion where a front plate of an apparatus of adjusting height of a headrest for a motor vehicle according to various exemplary embodiments of the present invention is fastened to a rear plate thereof movably in an up and down direction thereof.

To this end, as shown in FIG. 9, slide grooves 126 may be formed at opposite side positions on the rear surface portion of the front plate 120, to which the slide protrusions 116 of the rear plate 110 are fastened slidably in the up and down direction thereof.

Furthermore, the front plate 120 may be provided with an elongated in and out hole 122 formed in a right and left direction thereof, through which the locking end portion 154 of the lock plate 150 to be described below protrudes and is lockably inserted to the locking groove 112.

Furthermore, a second mounting groove 124 for assembling with a front cover 130 may be formed at a desired position on a peripheral portion of the front surface portion of the front plate 120.

At the front surface portion of the front plate 120, the front cover 130 may be mounted to the front plate to serve as a frame for a front pad 160.

To this end, a second mounting hole 132 may be formed on a peripheral portion of the front cover 130 to align with the second mounting groove 124 of the front plate 120.

Thus, by inserting a screw 123 through the second mounting hole 132 and tightening the screw 123 to the second mounting groove 124, the front cover 130 may be assembled to the front plate 120.

An insert plate 140 having a plate-shape structure with two or more guide pins 142 formed on the lower surface thereof and protruding downward may be mounted to the rear surface portion of the front cover 130. In another exemplary embodiment of the present invention, at least one guide pin 142 may be formed on the lower surface of the insert plate 140.

Figure 7:
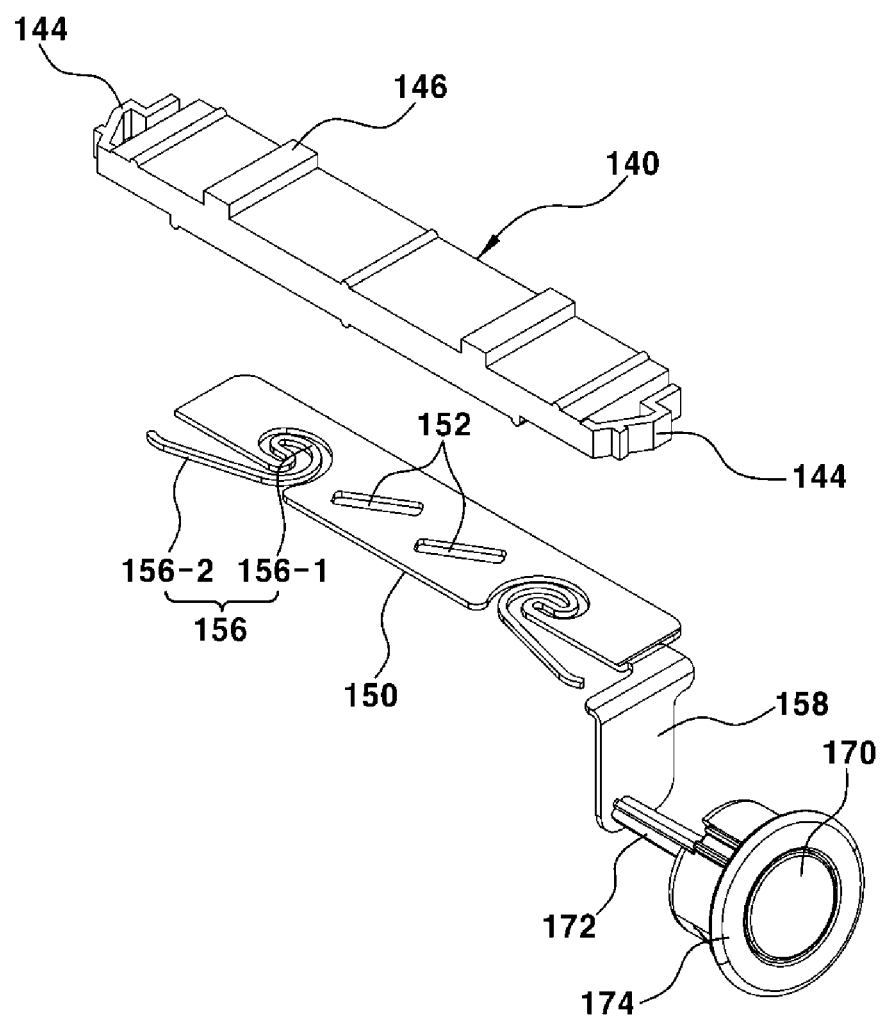
FIG. 7 and FIG. 8 are perspective views representing an insert plate and lock plate of an apparatus of adjusting height of a headrest for a motor vehicle according to various exemplary embodiments of the present invention.
Figure 8:
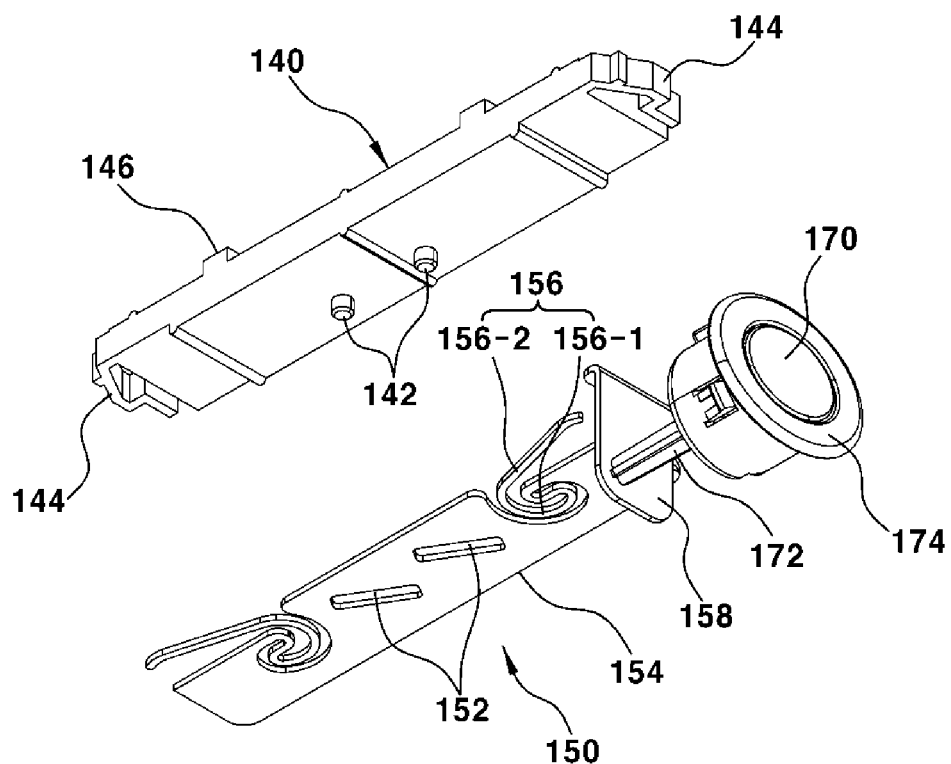

To this end, as shown clearly in FIGS. 7 and 8, elastic locking legs 144 may be formed at opposite side portions of the insert plate 140, and locking holes 134 for being fastened with the elastic locking legs 144 may be formed at opposite side portions on the rear surface of the front cover 130.

Furthermore, a guide projection 146 for guiding the insert plate 140 to a mounting position within the front cover 130 may be formed on the upper surface of the insert plate 140, and a guide groove 136 to which the guide projection 146 is inserted may be formed on the rear surface portion of the front cover 130.

Thus, by pushing the insert plate 140 to the rear surface portion of the front cover 130 while inserting the guide projection 146 into the guide groove 136, the elastic locking legs 144 are compressed and then inserted into the locking holes 134 to be returned to the original shape thereof and fastened to the locking holes 134, so that the insert plate 140 is assembled to the front cover 130.

At the present time, since the guide projection 146 is inserted into the guide groove 136, right and left movements of the insert plate 140 may be prevented.

When a button 170 is pressed, the lock plate 150 which is disposed under the lower surface of the insert plate 140 is moved in a rear direction toward the front portion of a motor vehicle body by the guidance of the guide pins 142 of the insert plate 140, whereas when the button 170 is released from the pressing state, the lock plate is moved in a front direction toward the rear portion of the motor vehicle body by the elastic restoring force of a spring and the guidance of the insert plate 140.

The lock plate 150, which may be disposed under the lower portion of the insert plate 140 to form a laminated structure together with the insert plate, may be provided with two or more guide holes 152 formed in the center portion thereof in an oblique manner with respect to the front and rear direction thereof, into which the guide pins 142 are inserted; the locking end portion 154 formed in the rear portion thereof which passes through the in and out hole 122 of the front plate 120 and is lockably inserted into the locking groove 112 of the rear plate 110; and the spring 156 formed in the front portion thereof which is elastically supported on the rear surface portion of the front cover 130. In another exemplary embodiment of the present invention, at least one guide hole 152 may be formed in the center portion of the lock plate 150.

In this regard, when the lock plate 150 is disposed under the lower portion of the insert plate 140 to form the laminated structure, the guide pins 142 are slidably inserted into the guide holes 152, and the locking end portion 154 is inserted into and disposed in the in and out hole 122 of the front plate 120.

The spring 156 may be configured for a coil portion 156-1 integrally formed with the lock plate 150, and a supporting leg 156-2 which extends from the coil portion 156-1 in a form of a free end portion and is elastically supported against the rear surface portion of the front cover 130.

Furthermore, a button connection plate 158 may be integrally formed at a side portion of the lock plate 150 in a form of a flat plate, and the button 170 may be pressably connected to the button connection plate 158 via a connection shaft 172.

In fact, the button 170 may be pressably disposed on a side surface of the front pad 160 covering the front cover 130.

To this end, the connection shaft 172 may be disposed to penetrate through the side surface of the front cover 130, and the button 170 may be pressably mounted on the side surface of the front pad 160.

The front pad 160 may be provided with a button bezel 174 formed in the side surface thereof in which the button 170 may be pressably accommodated.

Meanwhile, the front pad 160 may be configured for an internal cushion pad which provides a cushion feeling to the head or neck portion of an occupant coming into contact with the front pad, and an external skin cover which directly comes into contact with the head or neck portion of the occupant.

Hereinafter, the operation of the apparatus of adjusting height of a headrest for a motor vehicle of the present invention configured for the above-described components will be described.

Figure 10:
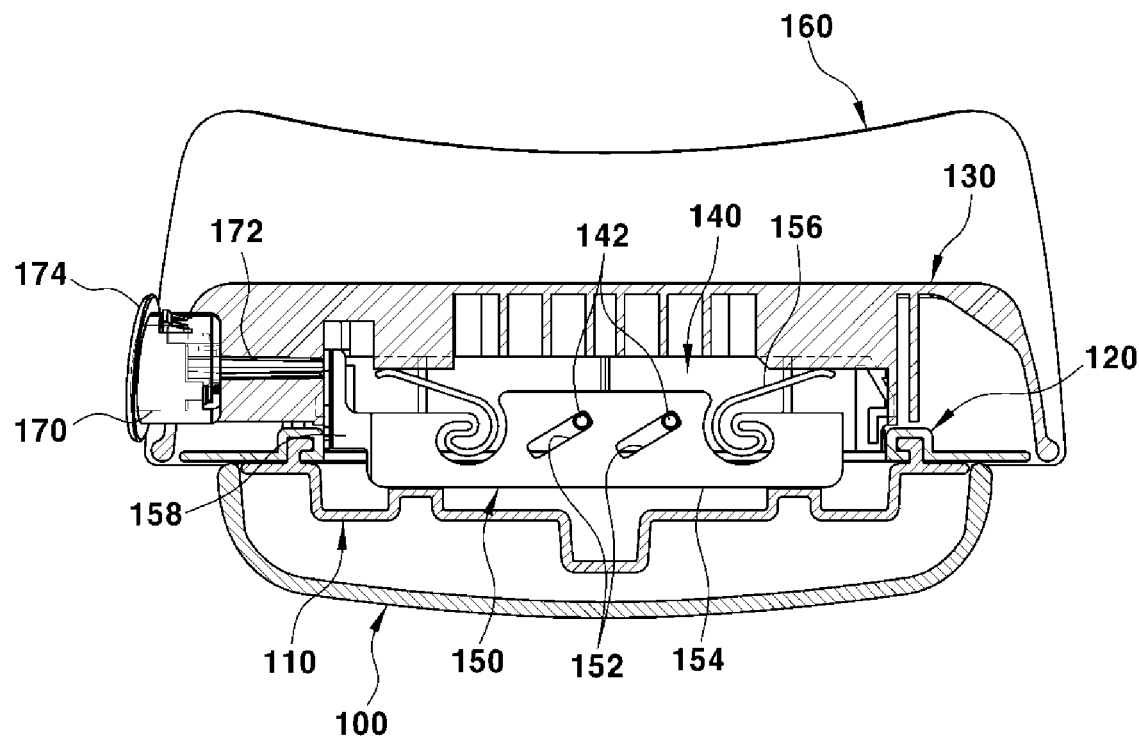
FIG. 10 is a horizontal sectional view representing a locking state of an apparatus of adjusting height of a headrest for a motor vehicle according to various exemplary embodiments of the present invention.
Figure 12:
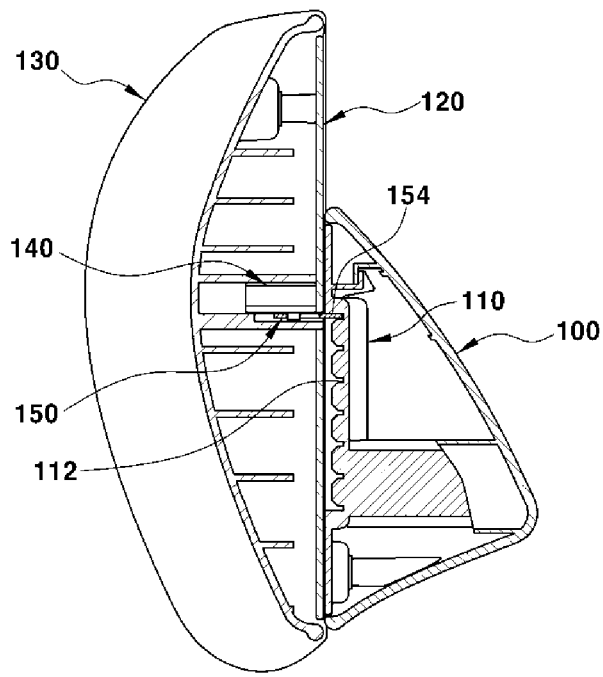
FIG. 12 is a vertical sectional view representing the locking state of an apparatus of adjusting height of a headrest for a motor vehicle according to various exemplary embodiments of the present invention.

Referring to accompanying FIGS. 10 and 12, before the button 170 is pressed, a state is maintained in which the locking end portion 154 of the lock plate 150 is provided to penetrate through the in and out hole 122 of the front plate 120 and is inserted into one of the locking grooves 112 of the rear plate 110.

Furthermore, before the button 170 is pressed, the guide pins 142 of the insert plate 140 may be located at the rear sides of the oblique guide holes 152 of the lock plate 150.

Furthermore, before the button 170 is pressed, a state is maintained in which the supporting leg 156-2 of the spring 156 is spaced from the rear surface portion of the front cover 130.

Therefore, since the state is maintained in which the locking end portion 154 of the lock plate 150 protrudes through the in and out hole 122 of the front plate 120 and is inserted into one of the locking grooves 112 of the rear plate 110 when the button 170 is not pressed, a state is maintained in which the front cover 130 and the front pad 160 as well as the front plate 120 are fixed.

In contrast, when the button 170 is pressed to raise or lower the height of the front pad 160 according to a body size or preference of the occupant, the pressing force is delivered to the button connection plate 158 via the button 170 and the connection shaft 172, and thus the lock plate 150 formed integrally with the button connection plate 158 is pushed in the side direction thereof.

Figure 11:
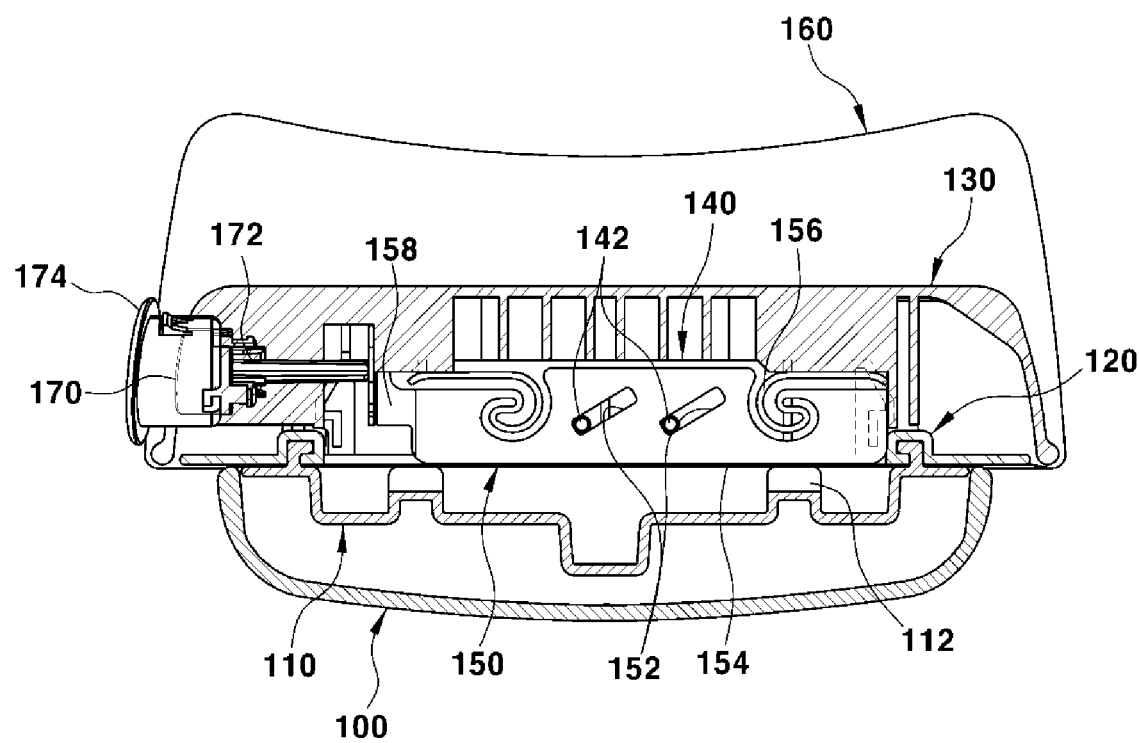
FIG. 11 is a horizontal sectional view representing a locking release state of an apparatus of adjusting height of a headrest for a motor vehicle according to various exemplary embodiments of the present invention.
Figure 13:
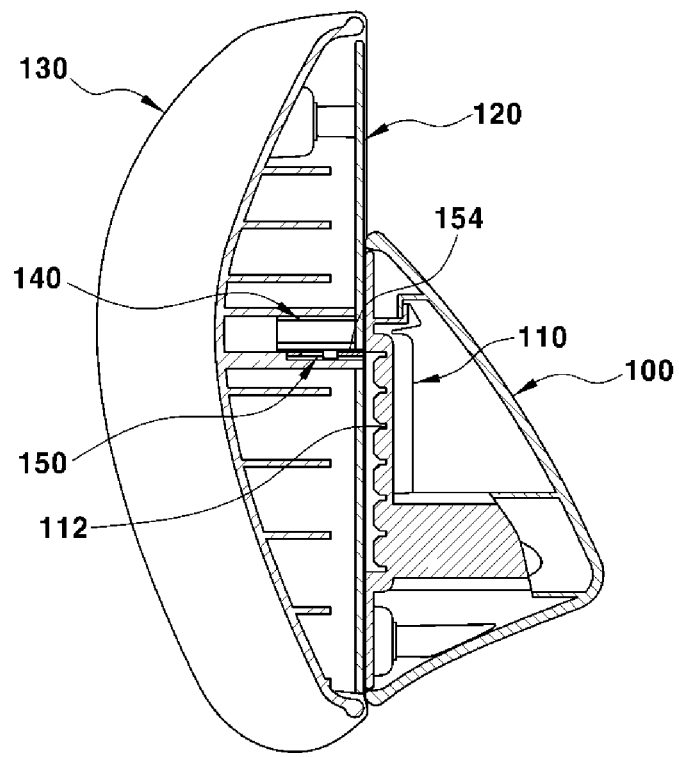
FIG. 13 is a vertical sectional view representing the locking release state of an apparatus of adjusting height of a headrest for a motor vehicle according to various exemplary embodiments of the present invention.

Accordingly, since the guide pins 142 of the insert plate 140 are inserted into the oblique guide holes 152 of the lock plate 150, the movement of the lock plate 150 in the side direction is converted to the rearward (front direction of the vehicle) movement by the guidance of the guide pins 142, so that a locking release state is approached in which the locking end portion 154 of the lock plate 150 is withdrawn back and extracted from the locking groove 112 of the rear plate 110, as shown in FIGS. 11 and 13.

At the present time, the guide pins 142 of the insert plate 140 may be located at the front section of the oblique guide hole 152 of the lock plate 150.

Additionally, since the lock plate 150 is pulled rearward (in a front direction of the motor vehicle), the supporting legs 156-2 of the springs 156 are brought into close contact with and compressed against the rear surface portion of the front cover 130.

Accordingly, the locking release state is approached in which the locking end portion 154 of the lock plate 150 is extracted from the locking groove 112 by pressing the button 170, and thus the front cover 130 and the front pad 160 as well as the front plate 120 are movable in the up and down direction thereof.

At the present time, since the slide protrusions 116 of the rear plate 110 are fastened to the slide grooves 126 of the front plate 120, the front plate 120, the front cover 130 mounted to the front plate 120 and the front pad 160 covering the front cover 130 may be slid and moved to a desired height.

After the height of the front pad 160 is adjusted to the position the occupant wants, the button 170 is released from the pressing, and then the locking end portion 154 of the lock plate 150 passes through the in and out hole 122 of the front plate 120 and is lockably inserted into another of the locking grooves 112 of the rear plate 110 by the restoring force of the supporting legs 156-2 of the spring 156, so that the front pad 160 is fixed to the position desired by the occupant.

Figure 14:
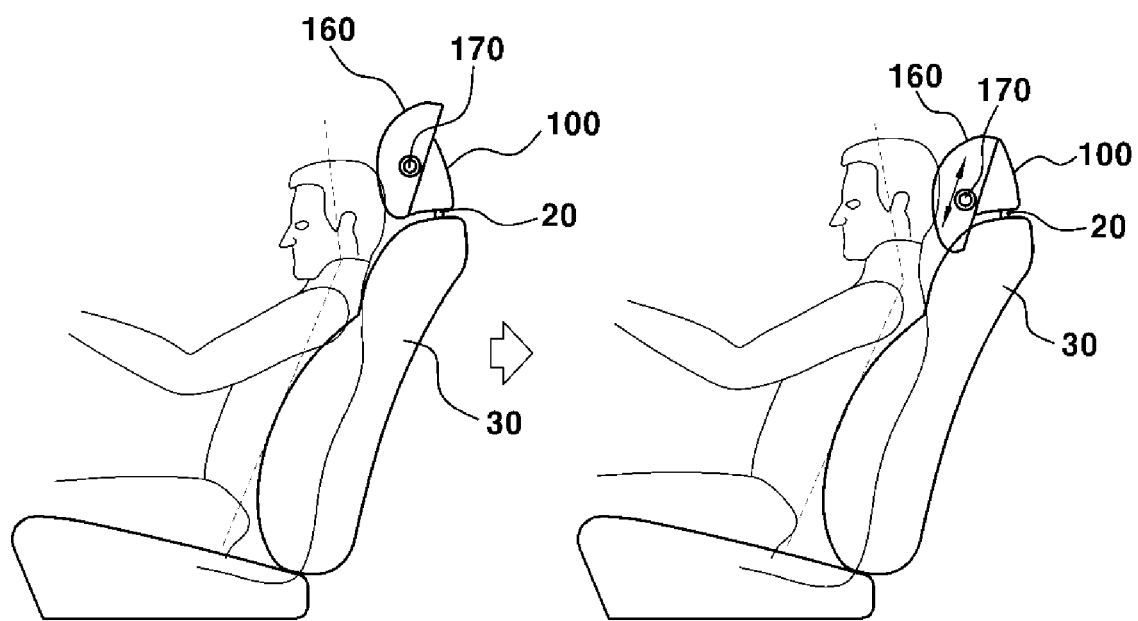
FIG. 14 is a side elevation view representing a use state of an apparatus of adjusting height of a headrest for a motor vehicle according to various exemplary embodiments of the present invention.

Accordingly, as shown in FIG. 14, it is possible for an occupant to adjust the height of the front pad 160 to a position suitable to his or her body or according to preference, and thus it is also possible for an occupant to make his or her neck or head portion comfortably supported by the front pad 160, regardless of his or her body size.

As described above, by forming the headrest with two divided parts, for example, the rear portion fixed to the seat back and the front portion assembled with and movable upwards and downwards relative to the rear portion, the height of the front portion may be adjusted according to the body size or preference of an occupant, and thus the head or neck portion of the occupant may be comfortably supported by the front portion regardless of the body size of the occupant.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of adjusting height of a headrest for a vehicle, the apparatus comprising:

a rear cover having a stay mounted thereto, the stay being inserted and fastened to a seatback;
a rear plate which is provided with a series of locking grooves formed on a front surface portion of the rear plate in an up and down direction, and is mounted to a front surface portion of the rear cover;
a front plate provided with an in and out hole penetratingly formed in the front plate, and fastened to the rear plate movably in an up and down direction thereof;
a front cover fastened to a front surface portion of the front plate to serve as a frame for a front pad;
an insert plate which is provided with at least two guide pins protruding therefrom, and is mounted to a rear surface portion of the front cover;
a lock plate which forms a laminated structure with the insert plate, and is provided with:
  at least two guide holes obliquely formed in a center portion of the lock plate with respect to a front and rear direction thereof and into which the at least two guide pins are inserted;
  a locking end portion formed in a rear portion of the lock plate and passing through the in and out hole of the front plate and being lockably inserted into one of the series of locking grooves of the rear plate; and
  a spring formed in a front portion of the lock plate and being elastically supported on the rear surface portion of the front cover;
the front pad mounted to a front surface portion of the front cover; and
a button which is pressably mounted in a penetrating hole formed in a side surface of the front cover, and is connected to the lock plate.

2. The apparatus of claim 1, wherein blocking protrusions are formed at upper and lower positions on the front surface portion of the rear plate, the blocking protrusions being configured to limit vertical movement of the lock plate by blocking the locking end portion of the lock plate.

3. The apparatus of claim 1,
wherein slide protrusions are formed at opposite side positions on the front surface portion of the rear plate, and slide grooves are formed at opposite side positions on a rear surface portion of the front plate, and
wherein the slide protrusions are fastened to the slide grooves slidably in the up and down direction thereof.

4. The apparatus of claim 1,
wherein a first mounting hole is formed in a peripheral portion of the rear plate, and a first mounting groove is formed in the rear cover, and
wherein a screw is inserted through the first mounting hole and fastened to the first mounting groove.

5. The apparatus of claim 1,
wherein a second mounting hole is formed in a peripheral portion of the front cover, and a second mounting groove is formed in the front surface portion of the front plate, and
wherein a screw is inserted through the second mounting hole and fastened to the second mounting groove.

6. The apparatus of claim 1, wherein the at least two guide pins are formed on a lower surface of a center portion of the insert plate to protrude downward therefrom and to be inserted into the at least two guide holes of the lock plate.

7. The apparatus of claim 1, wherein elastic locking legs are formed at opposite side portions of the insert plate, and locking holes for being fastened with the elastic locking legs are formed at opposite side portions on a rear surface of the front cover.

8. The apparatus of claim 7, wherein a guide projection is formed on an upper surface of the insert plate, and a guide groove to which the guide projection is inserted is formed on the rear surface portion of the front cover.

9. The apparatus of claim 1, wherein a button connection plate in a form of a flat plate is integrally formed at a side portion of the lock plate, and is connected to the button via a connection shaft.

10. The apparatus of claim 1, wherein the spring includes a coil portion integrally formed with the lock plate, and a supporting leg which extends from the coil portion in a form of a free end and is elastically supported by the rear surface portion of the front cover.

11. The apparatus of claim 1, wherein the front pad is provided with a button bezel formed in a side surface thereof in which the button is pressably accommodated.

12. An apparatus of adjusting height of a headrest for a vehicle, the apparatus comprising:
a rear cover having a stay mounted thereto, the stay being inserted and fastened to a seatback;
a rear plate which is provided with a series of locking grooves formed on a front surface portion of the rear plate in an up and down direction, and is mounted to a front surface portion of the rear cover;
a front plate provided with an in and out hole penetratingly formed in the front plate, and fastened to the rear plate movably in an up and down direction thereof;
a front cover fastened to a front surface portion of the front plate to serve as a frame for a front pad;
an insert plate which is provided with at least a guide pin protruding therefrom, and is mounted to a rear surface portion of the front cover;
a lock plate which forms a laminated structure with the insert plate, and is provided with at least a guide hole obliquely formed in a center portion of the lock plate with respect to a front and rear direction thereof and into which the at least a guide pin is inserted, a locking end portion formed in a rear portion of the lock plate and passing through the in and out hole of the front plate and being lockably inserted into one of the series of locking grooves of the rear plate, and a spring formed in a front portion of the lock plate and elastically supported; and
a button which is pressably mounted in a penetrating hole formed in a side surface of the front cover, and is connected to the lock plate.

13. The apparatus of claim 12, wherein blocking protrusions are formed at upper and lower positions on the front surface portion of the rear plate, the blocking protrusions being configured to limit vertical movement of the lock plate by blocking the locking end portion of the lock plate.

14. The apparatus of claim 12,
wherein slide protrusions are formed at opposite side positions on the front surface portion of the rear plate, and slide grooves are formed at opposite side positions on a rear surface portion of the front plate, and
wherein the slide protrusions are fastened to the slide grooves slidably in the up and down direction thereof.

15. The apparatus of claim 12, wherein elastic locking legs are formed at opposite side portions of the insert plate, and locking holes for being fastened with the elastic locking legs are formed at opposite side portions on a rear surface of the front cover.

16. The apparatus of claim 15, wherein a guide projection is formed on an upper surface of the insert plate, and a guide groove to which the guide projection is inserted is formed on the rear surface portion of the front cover.

17. The apparatus of claim 12, wherein the spring includes a coil portion integrally formed with the lock plate, and a supporting leg which extends from the coil portion in a form of a free end and is elastically supported by the rear surface portion of the front cover.

\* \* \* \* \*